US006179986B1

(12) United States Patent
Swette et al.

(10) Patent No.: US 6,179,986 B1
(45) Date of Patent: Jan. 30, 2001

(54) SOLID POLYMER ELECTROLYTE ELECTROCHEMICAL OXYGEN CONTROL SYSTEM WITH INTEGRAL REACTOR FEEDBACK SENSING

(75) Inventors: Larry L. Swette, Newton; Anthony B. LaConti, Lynnfield, both of MA (US)

(73) Assignee: Giner Electrochemical Systems LLC, Waltham, MA (US)

( * ) Notice: Under 35 U.S.C. 154(b), the term of this patent shall be extended for 0 days.

(21) Appl. No.: 09/186,942

(22) Filed: Nov. 5, 1998

(51) Int. Cl.[7] ...................................................... C25B 1/00
(52) U.S. Cl. ......................... 205/337; 205/763; 205/765; 204/228.6; 204/229.2; 204/229.4; 204/229.8
(58) Field of Search .................................. 205/337, 763, 205/765; 204/228.6, 229.2, 229.4, 229.8

(56) References Cited

U.S. PATENT DOCUMENTS

| | | | |
|---|---|---|---|
| 3,992,271 | 11/1976 | Danzig et al. ........................ | 204/129 |
| 4,039,309 | 8/1977 | Albanese et al. ........................... | 65/2 |
| 4,039,409 | 8/1977 | LaConti et al. ....................... | 204/129 |
| 4,212,891 | 7/1980 | Yuko et al. ............................ | 426/231 |
| 4,311,569 | 1/1982 | Dempsey et al. ..................... | 204/129 |
| 5,647,970 | * 7/1997 | Arata ..................................... | 205/763 |
| 6,083,459 | * 7/2000 | Mukai et al. ........................... | 422/40 |

OTHER PUBLICATIONS

Whiting, D.C., "Potential of low oxygen/moderate carbon dioxide atmospheres for postharvest disinfestation of New Zealand apples", New Zealand Journal of Crop and Horticultural Science, 1992, vol. 20, pp. 217–222.

Chu, C.L. "Postharvest control of San Jose Scale on apples by controlled atmosphere storage", Postharvest Biology and Technology, 1(1992), pp. 361–369.

(List continued on next page.)

Primary Examiner—Arun S. Phasge

(74) Attorney, Agent, or Firm—Hale and Dorr LLP

(57) ABSTRACT

Disclosed is a novel proton-exchange membrane (PEM) based solid polymer electrolyte electrochemical oxygen control (EOC) system that can deplete and control the oxygen from a closed container to levels sufficient for both disinfestation and preservation. With the use of this electrochemical process, many insects that infest raw agricultural products and other produce can be exterminated, without detriment to the quality of the produce and without deposition of harmful residue, by reducing the ambient oxygen to a controlled low level for several days. The electrochemical process features the use of a bipolar stack comprised of a selected number of PEM cells connected electrically in series and separated by an electrically conductive bipolar plate. Each cell contains a membrane and electrode assembly, consisting of an anode structure and cathode structure in intimate contact with a PEM. When DC power is applied to the cell stack, electrons are supplied to the cathode, supporting reduction of oxygen at the cathode with the formation of water, and electrons removed from the anode, supporting oxygen evolution by the decomposition of water at the anode. The anode and cathode compartments are separated by the solid ionomer PEM, which transports protons generated at the anode through the PEM to the cathode to complete the electrical circuit internally. Oxygen is depleted by recirculating the gas in the dosed container over the cathode, and expelling the oxygen evolved at the anode by separating the oxygen from the recirculating anode water stream and venting it to the outside of the closed container. Nitrogen or other inert gas is added as makeup gas to avoid creating a negative pressure in the container. A unique feature of this process is that at a low oxygen concentration, the cell and stack cathode current becomes rate-limited in direct proportion to the oxygen level in the recirculating gas and can therefore be used as a measure of the container oxygen level. In the sensing/control scheme developed as part of this invention, the current is periodically allowed to rise to the diffusion limit in a "measure mode" and then reset according to the desired oxygen level, determined from a slope-intercept "measure mode" calibration curve, for a longer "control mode" period.

10 Claims, 9 Drawing Sheets

OTHER PUBLICATIONS

DeLinda, C.P.F., "Field expierence with hermetic storage of grain in Eastern Africa with emphasis on structuress intended for famine reserves", National Agricultural Laboratories, pp. 39–53; (no date).

Jay, Edward, "Recent advances in the use of modified atmospheres for the control of stores–product insects", Stored–Products Insects Research and Development Laboratory Agricultural Research Service, Department of Agriculture, Savannah, Georgia 31403, pp. 241–254; (no date).

Ke, Dangyang and Kader, Adel A., "Potential of controlled atmospheres for postharvest insect disinfectation of fruits and vegetables", Postharvest News and Information 1992, vol. 3 No. 331N, Jun. 9, 1995, pp. 2–8.

Ke, Dangyang and Kader, Adel A., "External ans Internal Factors Influence Fruit Tolerance to Low–Oxygen Atmospheres", Amer. Soc. Hort. Sci. 1992, 117(6), pp. 913–918.

* cited by examiner

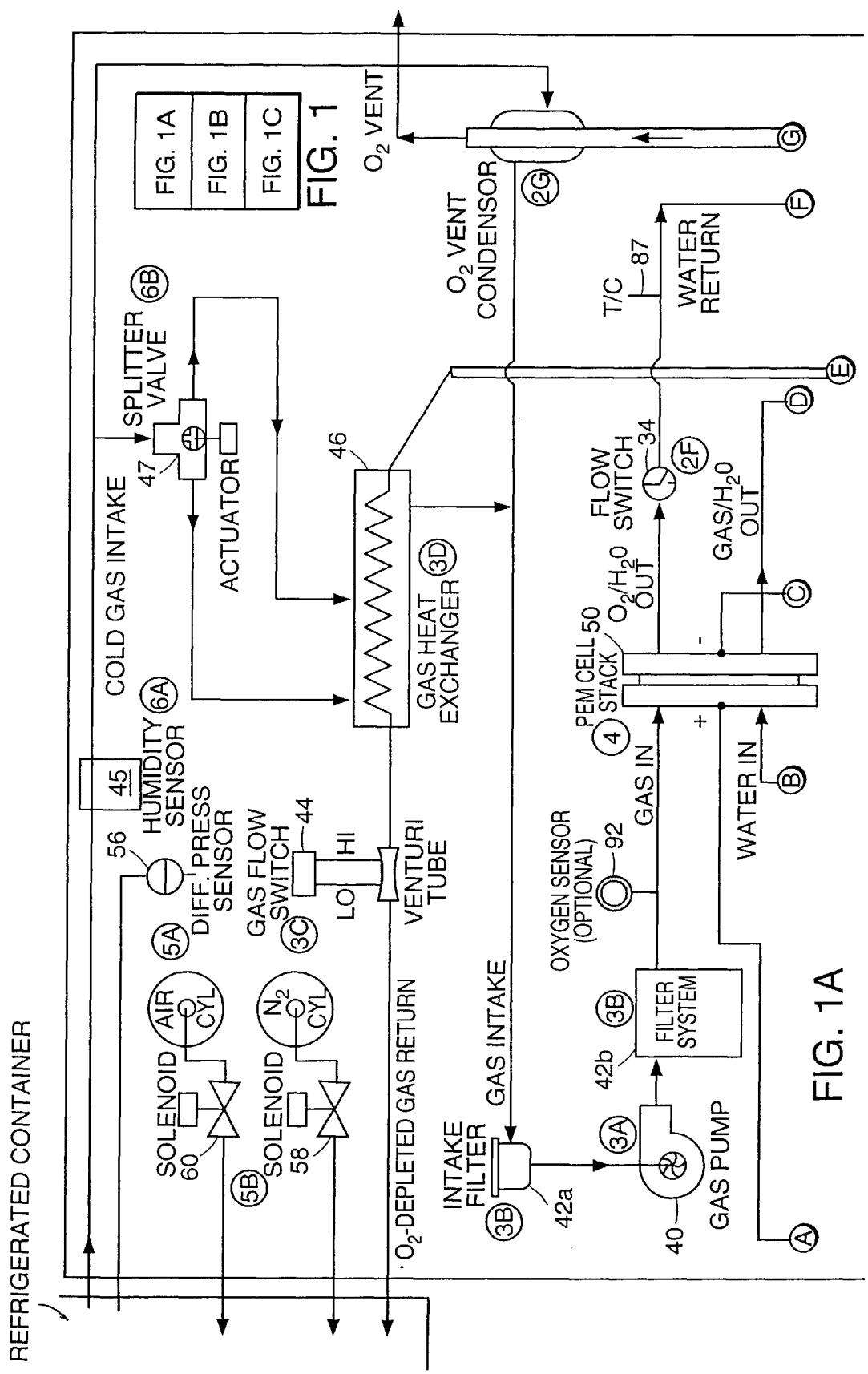

EOC SUBSYSTEMS

1. WATER ADDITION/RECOVERY SYSTEM
   A. RESERVE TANK & LEVEL SENSOR
   B. FILTER
   C. DEIONIZERS
   D. TRANSFER PUMPS
   E. WATER/GAS PHASE SEPERATOR
2. WATER RECIRULATION SYSTEM
   A. RECIRC. WATER TANK & LEVEL SENSORS
   B. RECIRULATION PUMP
   C. FILTER
   D. DEIONIZER
   E. WATER HEATER & THERMOCOUPLE
   F. WATER FLOW SWITCH
   G. OXYGEN VENT CONDENSOR
3. GAS RECIRCULATION SYSTEM
   A. GAS PUMP, 3 CFM
   B. FILTERS
   C. VENTURI & GAS FLOW SWITCH
   D. GAS HEAT EXCHANGER
4. PEM ELECTROCHEMICAL OXYGEN TRANSFER CELL STACK
5. DIFFERENTIAL PRESSURE CONTROL
   A. DP SENSOR
   B. SOLENOID VALVES
6. HUMIDITY CONTROL
   A. HUMIDITY SENSOR
   B. SPLITTER VALVE
7. DC POWER SUPPLY
8. PROCESS CONTROLLER
9. AC POWER TRANSFORMER

SCHEMATIC OF ELECTROCHEMICAL OXYGEN CONTROL SYSTEM

FIG. 1C

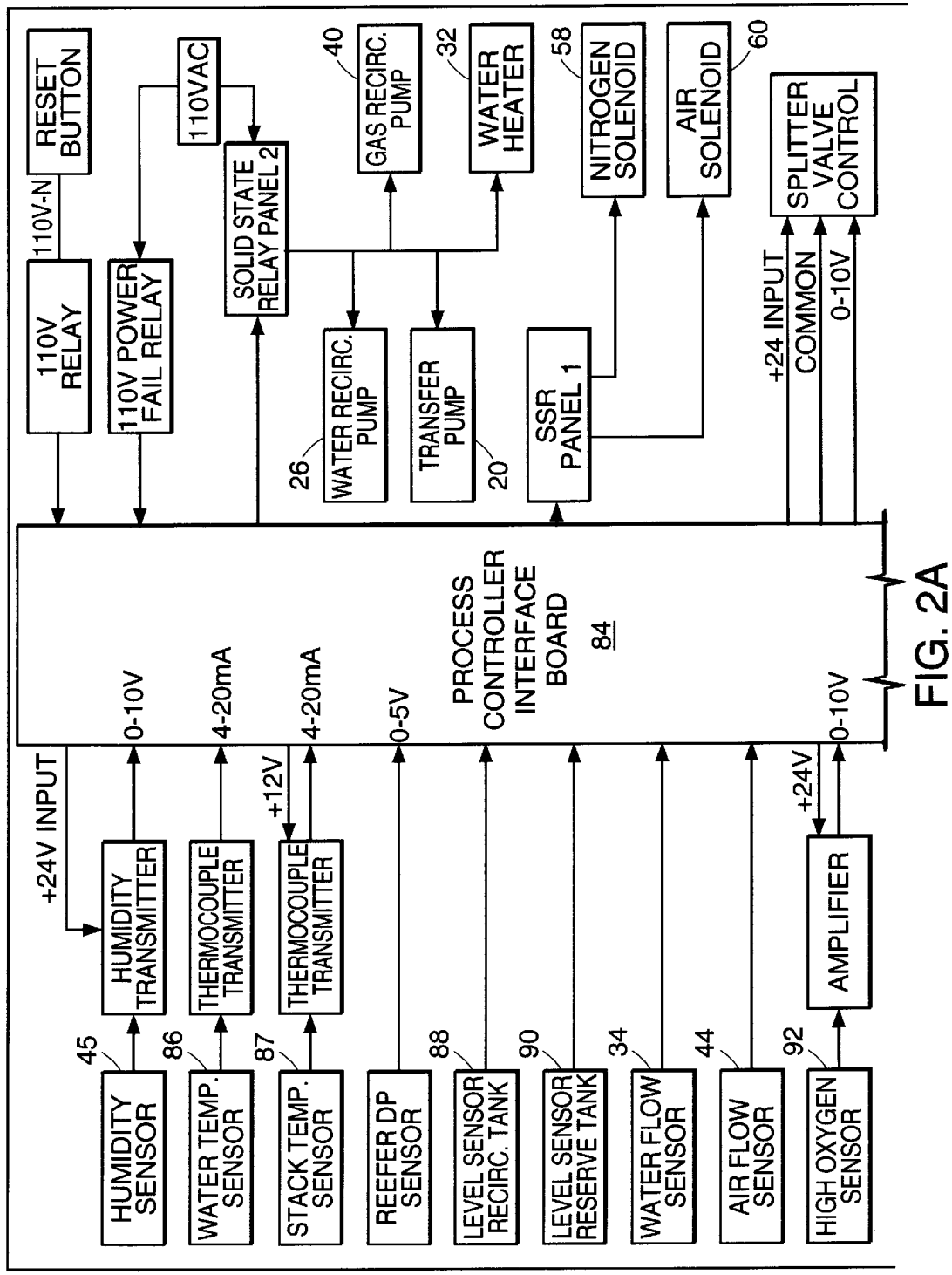

EOC SYSTEM INTERFACE TO PROCESS CONTROLLER

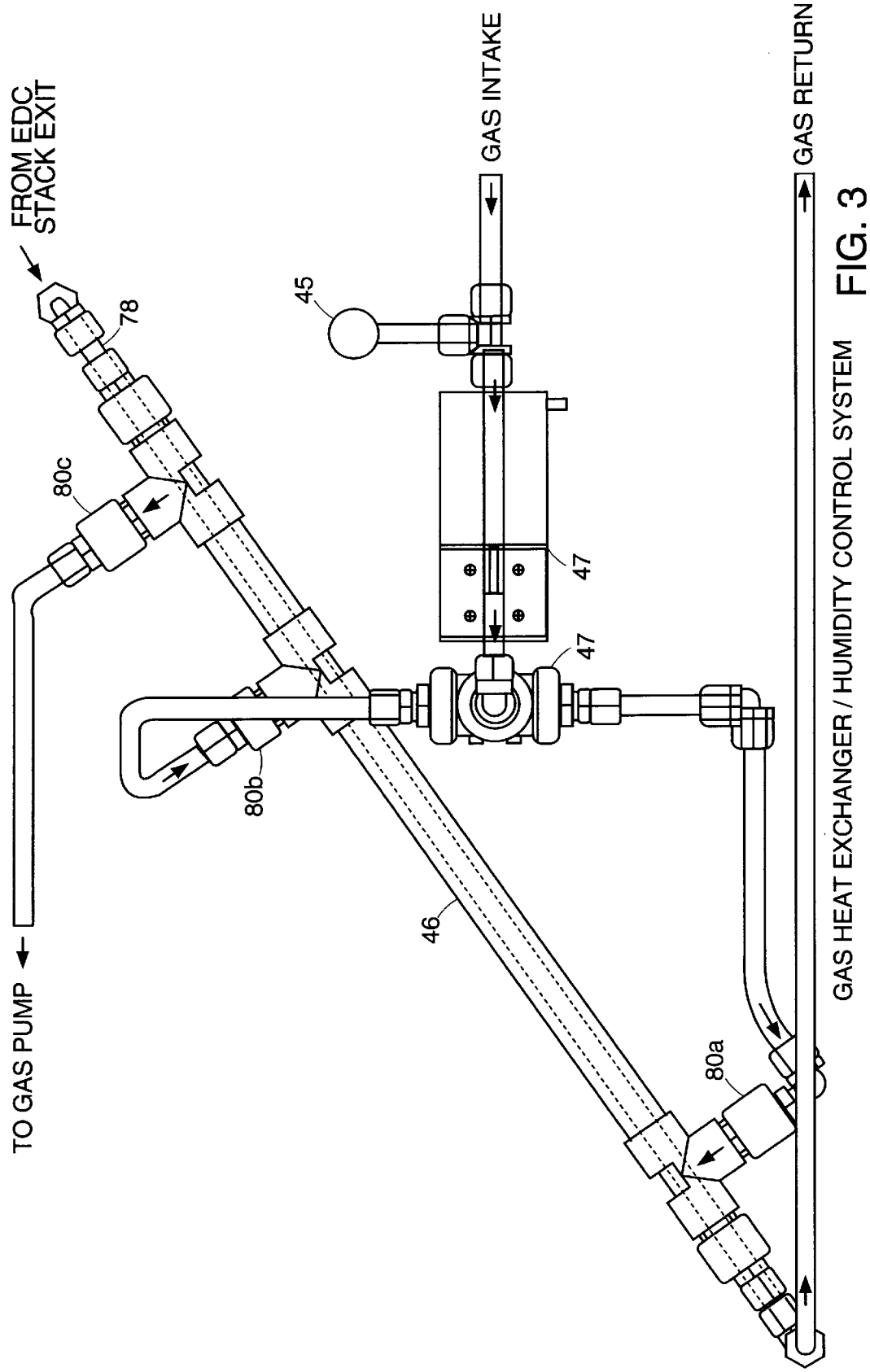

ELECTROCHEMICAL OXYGEN CONTROL (EOC) CELL STACK (50)
[TOP VIEW] SHOWING REACTANTS (IN) AND PRODUCTS (OUT)
AND REPEATING ASSEMBLIES (SEE FIGURE 4).

EOC MEASURED OXYGEN VS. STACK CURRENT

SOLID POLYMER ELECTROLYTE ELECTROCHEMICAL OXYGEN CONTROL SYSTEM WITH INTEGRAL REACTOR FEEDBACK SENSING

BACKGROUND OF THE INVENTION

The present invention relates to oxygen control systems and more particularly to an oxygen control system for controlling the level of oxygen in fresh food storage containers.

The advent of containerized refrigerated cargo transport has allowed fresh agricultural products to be shipped to ever more distant markets and has enabled the transfer of containers between different modes of transport (e.g., truck to ship to truck) as required without rehandling of the cargo. Insect infestation of raw agricultural products is a universal problem in produce storage, processing and shipping that must be effectively addressed to minimize health concerns and to maintain an appetizing appearance, shelf life and marketability. Cargos that cross national boundaries are also generally subject to stringent regulations for all the same reasons as well as to prevent the importation of harmful new agricultural pests. Compared to losses in the field, the losses become increasingly significant during transportation as further value is added to the product in harvesting, packaging and shipping. Disinfestation can be achieved by heating or freezing but not without some sacrifice in quality, and the use of insecticides and fungicides is becoming increasingly unacceptable.

The use of containerized cargo transport in which containers carry a dedicated refrigeration unit ("reefers") has presented the opportunity to employ controlled-atmospheres for preservation of perishable products. Controlled-atmosphere (CA) shipment of food products and other perishables for preservation has received significant attention in recent years. For example, Transfresh Corporation has developed technology to effectively "seal" reefers and to sufficiently control the oxygen and other gas composition within the container to extend the fresh shelf-life of many agricultural and perishable products. Recently, systems have been developed for active continuous removal of oxygen leaking into "sealed" reefers to very low levels (<1000 ppm) to extend CA technology to the shipment of fresh meat and fish products.

The principle of hermetic storage has been known from pre-industrial times and has been widely implemented for grain, bean and oil-seed storage in underground pits; the first large scale tests were run in Paris from 1819 to 1830. This principle has been steadily improved upon and extended ever since. Existing oxygen removal systems for shipment of fresh meat and fish are on-board systems that actively maintain oxygen at the lowest level possible, compensating for any air leakage throughout the shipping period (2–3 weeks). On-board systems need to be small for the least product displacement and for conservation of power; this is achieved by pre-flushing the container, tight sealing against leaks and pressure control to reduce the initial power demand and the subsequent load on the system. This very low concentration of oxygen would generally be lethal to most insects but it is not generally compatible with produce that respires. Iceberg lettuce, for example, requires >1200 ppm of oxygen to prevent spoilage, but, <1800 ppm at 36° F. over a three-day exposure to kill green peach aphids; this is followed by 10 days at 2% $O_2$ in transit, the normal CA shipping environment. The requirements for a disinfestation system then would be:

1) Controlled oxygen levels rather than minimum oxygen maintenance.
2) Continuous oxygen concentration measurement of sufficient resolution to set the required oxygen levels for a variety of products.

The specific technology solutions that have been used to address the above problems will now be discussed.

a. Modified-Atmosphere Disinfestation.

Hermetic storage has long been used for disinfestation of grain, beans and oil-seeds stored in underground pits. This process involves sealing the product in a pit, bin or silo and allowing the respiration of the stored product to reduce the oxygen to a level lethal to insects. Primitive versions of hermetic storage are in active use in many third world countries with mild winters, and more modern concrete storage containers are in continuous use for corn storage in Cyprus and Kenya to provide famine protection. This concept of modifying atmospheres was extended in the 1860s by adding nitrogen or "burned air" to grain storage silos. However serious interest in using the technique in a practical, routine manner was not pursued until the 1950s and 1960s. Until this time conventional fumigants and grain protectants had been successful in controlling stored-product pests. At that time, people began to realize that the chemicals, if used improperly, left objectional residues and were hazardous to apply. There was also a potential for the development of insect resistance to these chemicals. Research and development in controlled atmosphere disinfestation has been on-going since the 1960s with considerable success. It has been found that low temperatures, low oxygen and high carbon dioxide separately or in various combinations can be effective for disinfestation. For fresh produce there is the additional requirement to maintain sufficient oxygen to prevent acceleration of ripening or spoilage. The conditions of atmosphere and exposure time to achieve disinfestation without excessive ripening tends to be complex and unique to the combination of agricultural product and indigenous pest(s).

A method and apparatus for storing foodstuffs using an electrolytic cell is described in U.S. Pat. No. 4,212,891 issued to Fujita and Kudo. This apparatus included a liquid alkaline electrolyte electrolytic stack and system, but did not include integral reactor feedback sensing. Moreover, with an alkaline system, the ambient $CO_2$ reacts with the electrolyte and frequently there is liquid electrolyte leakage into the seal and manifold area, leading to competing reactions and shunt currents. Also, at near-ambient temperatures, water and electrolyte concentration management is difficult with a liquid electrolyte system. This makes feedback sensing and control difficult, especially if the same stack would be used for oxygen depletion, monitoring and control.

b. Controlled-Atmosphere (CA) Technology.

The Tectrol® CA systems developed by Transfresh and in wide use (more than 22,000 CA-equipped reefers worldwide) are implemented in three stages: 1) sealing of specially equipped containers after loading; 2) inert-gas flushing down to 1–2% oxygen; and 3) controlled leakage of air and removal of carbon dioxide to compensate for respiration, based on regular oxygen and carbon dioxide concentration measurements during shipment. The addition of oxygen is accomplished with a unique air-exchange system; a slide valve inside the Tectrol controller, which is mounted in an access panel at the front of the reefer, allows precise amounts of pressurized air generated by the reefer fan to be pushed out through an air-exchange outlet port and outside air to be drawn into the low pressure side of the fan through an air-exchange inlet port. The removal of carbon dioxide is accomplished by periodically circulating the reefer atmosphere through a lime bed based on carbon dioxide sensor measurements. The atmosphere thus achieved lowers respiration extending the fresh life of the produce over a longer period of time but it is not typically adequate to effect disinfestation.

It is therefore a principal object of the present invention to provide a proton-exchange-membrane based electrochemical oxygen control system that can deplete, monitor and control oxygen in a closed container to levels sufficient to achieve disinfestation.

It is another object to the present invention to provide a proton-exchange-membrane based electrochemical oxygen control system that can provide feedback sensing to control oxygen levels using the same electrochemical cells stack for oxygen depletion, monitoring and control.

SUMMARY OF THE INVENTION

The novel proton-exchange membrane (PEM) based solid polymer electrolyte electrochemical oxygen control (EOC) system of the present invention can deplete and control the oxygen from a closed container to levels sufficient for disinfestation. The electrochemical process features the use of a bipolar stack comprised of a selected number of PEM cells connected electrically in series by an electrically conductive bipolar plate. Each cell contains a hybrid membrane and electrode assembly, consisting of an electrolyzer anode structure and a fuel cell cathode structure in intimate contact with a PEM. When DC power is applied, oxygen is reduced at the cathode forming water, and water is decomposed evolving oxygen at the anode. The anode and cathode compartments are separated by the solid ionomer PEM, which transports protons generated at the anode to the cathode to complete the electrical circuit internally. Oxygen is depleted by recirculating the gas in the closed container over the cathode, and expelling the oxygen evolved at the anode by separating the gas from the recirculating anode water stream. Nitrogen (or another inert gas such as argon, helium or carbon dioxide) makeup gas is added to avoid creating a negative pressure in the container. A unique feature of this process is that at a low oxygen concentration, the cell and stack cathode current becomes rate-limited and can therefore be used as a measure of the container oxygen level. In the sensing/control scheme of the present invention, the current is periodically allowed to rise to the diffusion limit in a "measure mode" and then reset according to the desired oxygen level, determined from a slope-intercept calibration curve, for a longer "Control Mode" period. Maintenance of the desired level is then implemented by cycling the system to remeasure the oxygen concentration and then continuing removal or opening an air leak. Existing systems can remove oxygen or open an air leak but they lack sufficient sensor resolution for very low oxygen control and measurement.

The anticipated benefits of this invention are greater availability of fresh healthy agricultural products without the loss of quality associated with disinfestation by heating or freezing or the chemical residues from pesticides. There should also be substantial cost savings associated with the prevention of losses that would otherwise occur for producers, shippers and consumers. This technology may also open more distant markets for American products by ship transport that are now only accessible by limited, expensive air transport. In addition, the technology developed is anticipated to find application for disinfestation in many other environments such as the shipment of lumber and flowers and for disinfestation of books and museum articles.

These and other objects and features of the present invention will be more fully understood from the following detailed description which should be read in light of the accompanying drawings.

BRIEF DESCRIPTION OF THE DRAWING

FIG. 3 is a top view of the gas heat exchanger/humidity control system and gas splitter valve used in the electrochemical oxygen control system shown in FIG. 1.

DETAILED DESCRIPTION OF THE PREFERRED EMBODIMENTS

Figure 1B:
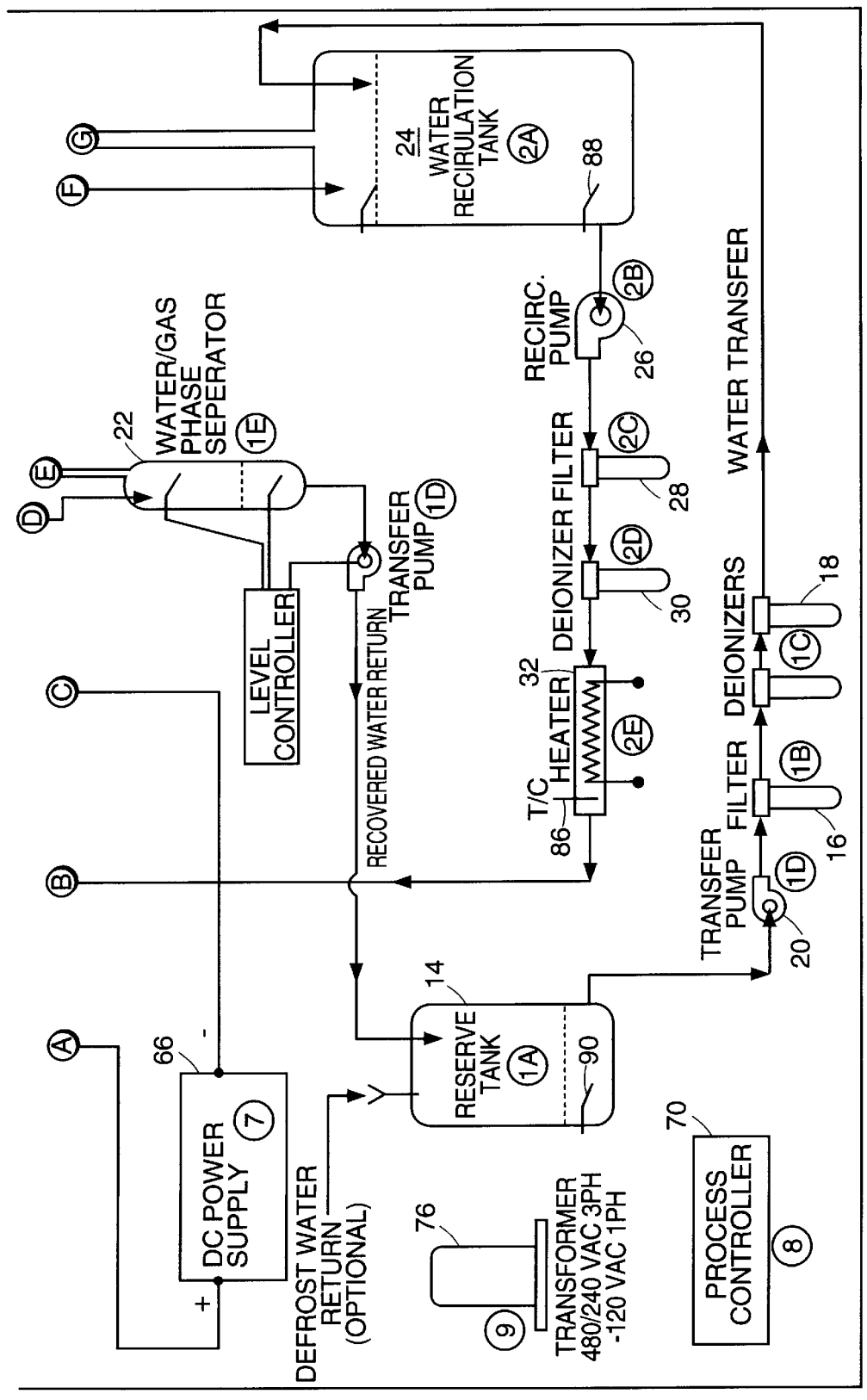
FIG. 1 is a schematic diagram of the components of the electrochemical oxygen control system of the present invention.

Referring to FIG. 1, a system 10 of the present invention is shown which includes a number of subsystems. The main subsystems are 1) water addition/recovery system which includes a reserve tank 14 for storing returned, defrost-water and recovered water, filters 16 and deionizers 18 for filtering and deionizing water being recirculated from reserve tank 14, a transfer pump 20 for drawing water out of the reserve tank 14, and water/gas phase separator 22 to recover entrained liquid water from the recirculating gas stream. (This subsystem serves as the defrost-water recovery system if the system 10 is used as an on-board electrochemical oxygen removal (EOR) system, and allows for the addition of tap water if the system 10 is used as a land-based EOC system); 2) a water recirculation system including a tank 24, which in a preferred embodiment is a 15-gallon tank for storing recirculated water, a continuous circulation pump 26 for recirculating water out of tank 24, filter 28 and deionizer 30 for filtering and deionizing water recirculated from tank 24, heater/controller 32 for freeze protection and for better, more consistent operation of the EOC cell stack, flow sensor 34 to verify water flow before startup and to trigger system shutdown in the absence of water flow (pump failure or broken line), and an oxygen/water phase separator 36 to recover entrained liquid water and to condense water vapor from the oxygen overboard vent stream; 3) a gas recirculation system including a gas pump 40 which in a preferred embodiment is a 3 cfm gas pump for recirculating the reefer gas (typically high nitrogen and low oxygen) from the refrigerated container through the EOC system and back to the container, filters 42a, 42b for filtering the gas, flow sensor 44 to verify gas flow through the EOC before startup and to trigger system standby (water pump and heater on for freeze protection) in the event of gas pump failure or a broken line, a humidity sensor 45 to provide feedback control of splitter valve 47, and a heat exchanger 46; 4) a PEM electrochemical oxygen transfer cell stack 50 including 10 to 12 cells (preferably 315 $cm^2$/cell) connected in series which will consume oxygen at the cathodes and regenerate the oxygen into the water stream at the anodes in an EOC system; 5) differential pressure control system, to maintain a slight positive pressure (~0.02 inches of water) inside the reefer), including a differential pressure sensor 56 to measure the differential pressure between the inside and outside of the reefer, and two solenoid valves 58, 60, one 58 for nitrogen and one 60 for air (the solenoids to add nitrogen or air from cylinders, to compensate for the oxygen removed by the EOC and gas leakage caused by temperature driven pressure changes, in order to maintain a positive pressure in the reefer); 6) a humidity control system which operates a splitter valve 47 regulating the flow of the cold intake gas through a shorter or longer section of the gas heat exchanger 46 to respectively warm or cool the return gas traveling through the central tube of the heat exchanger, according to the humidity of the container-gas measured by the humidity sensor 45 in the intake gas stream; 7) a DC power supply 66, which preferably provides up to 300 W in an EOR on-board system, or 1 kW in the EOC system; 8) a process controller 70, which in a preferred embodiment is a microprocessor-based data acquisition system with sensing and control interfaces to all of the subsystems, as shown in FIG. 2; and 9) a power transformer 76, capable of accepting 240 or 480 VAC 3-phase power and providing three 120 VAC circuits (EOR 1.5 kVA, EOC 2 kVA).

Figure 2B:
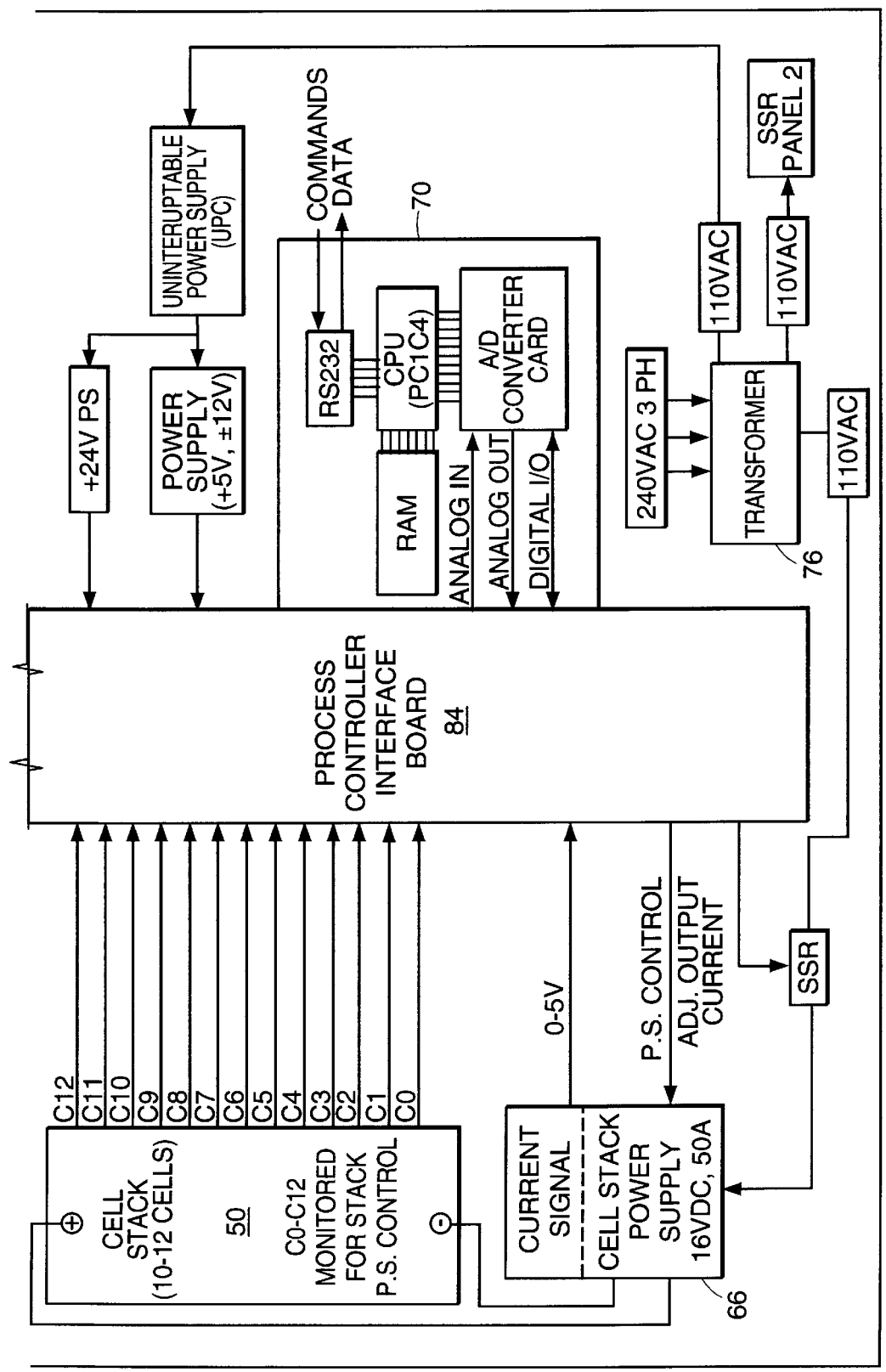
FIG. 2 is a block diagram of the interface between the process controller and the EOC system.

The system 10 of the present invention also includes a number of sensors which are connected to the interface board 84 of the process controller 70 shown in FIG. 2. Such sensors include the humidity sensor 45 which senses the humidity in the circulating gas stream; a water temperature sensor 86 which senses the temperature of the water in the water heater chamber; a cell temperature sensor 87 that measures the temperature of the anode-water exit stream: a water level sensor 88 for sensing the level of water in the recirculation tank 24; a level sensor 90 for sensing the level of the water in the reserve tank 14; a water flow sensor 34 which monitors the water flow through the cell stack and into the water recirculation tank 24; an airflow sensor 44 which monitors the depleted gas return; and an optional high oxygen sensor 92 which senses the level of oxygen in the refrigerated container.

Referring to FIG. 3, the gas heat exchanger 46, humidity control system 45 and splitter valve 47 are shown in greater detail. The purpose of the heat exchanger 46 is to regulate the humidity of the gas returning to the container by adjusting the temperature in the heat exchanger 46. As shown in FIG. 3, the heat exchanger includes a ⅝ inch diameter titanium tube 78 about three (3) feet long running through a one (1) inch diameter PVC pipe provided with three ports 80a, 80b, 80c along the length. The return gas, exiting the EOC stack 50, passes through the titanium tube 78. The cold intake gas from the refrigerated container is drawn in through the PVC pipe by the gas pump 40 around the outside of the titanium tube 78. The signal from a humidity sensor 45 in the intake gas stream (monitoring the humidity of the refrigerated container) is used to operate splitter valve 47 which regulates the flow pattern of the intake gas stream. If the humidity is above the upper limit, the splitter valve is rotated to send more cold gas through a longer section of the heat exchanger. If the humidity is below the lower limit, the splitter valve 47 is rotated to pull the cold intake gas through the shortest section, through port 80b only.

The system 10 described above has an electrochemical stack 50 with a number of series-connected bipolar cell assemblies. The cell components (repeating cell assemblies) of the EOC stack are shown in greater detail in FIG. 4. An anode water flow frame 100 (polysulfone or equivalent) houses an integral lightly platinized (0.2 mg/cm$^2$) Ti current collector/water distribution mesh package 102, which is fabricated by spot welding an expanded mesh (of the type sold by Exmet Corp., Conn. under the designation 3Ti5-4/0) to a coarse woven wire mesh sold by Unique Wire Weaving Co. under the designation Ti-18×18m-0.011w until the total mesh thickness is equivalent to the thickness of frame material (0.15 cm in preferred embodiment). A membrane and electrode assembly (MEA) 104 includes (a) an oxygen evolution anode catalyst structure 106 which is constructed of select combinations of Pt, Ir and Ru such as described in U.S. Pat. Nos. 3,992,271, 4,039,309 and 4,311,569 issued to LaConti, et al., the teachings of which are incorporated herein by reference, (b) a proton exchange membrane 108 such as Nafion 117 sold by E.I. duPont, Wilmington, Del., and (c) a Pt containing porous carbon-supported oxygen reduction cathode structure 110 such as described in U.S. Pat. No. 4,215,183 issued to MacLeod (the anode and cathode structures are bonded to opposite sides of the Nafion 117 to form the MEA). A cathode gas flow frame (polysulfone or equivalent) 112 houses a grooved carbon current collector/water distribution plate 114. The groove pattern in the plate 114 may be parallel, pin field, diamond, pillar or serpentine and the plate 114 may be made of materials such as porous graphite, solid graphite or TiC. A solid bipolar separator plate 116 constructed of a thin conductive plate such as Ti foil or molded graphite as described in U.S. Pat. Nos. 4,214,969 and 4,339,322, issued to Lawrance is positioned next to the cathode gas flow frame 112.

Figure 4:
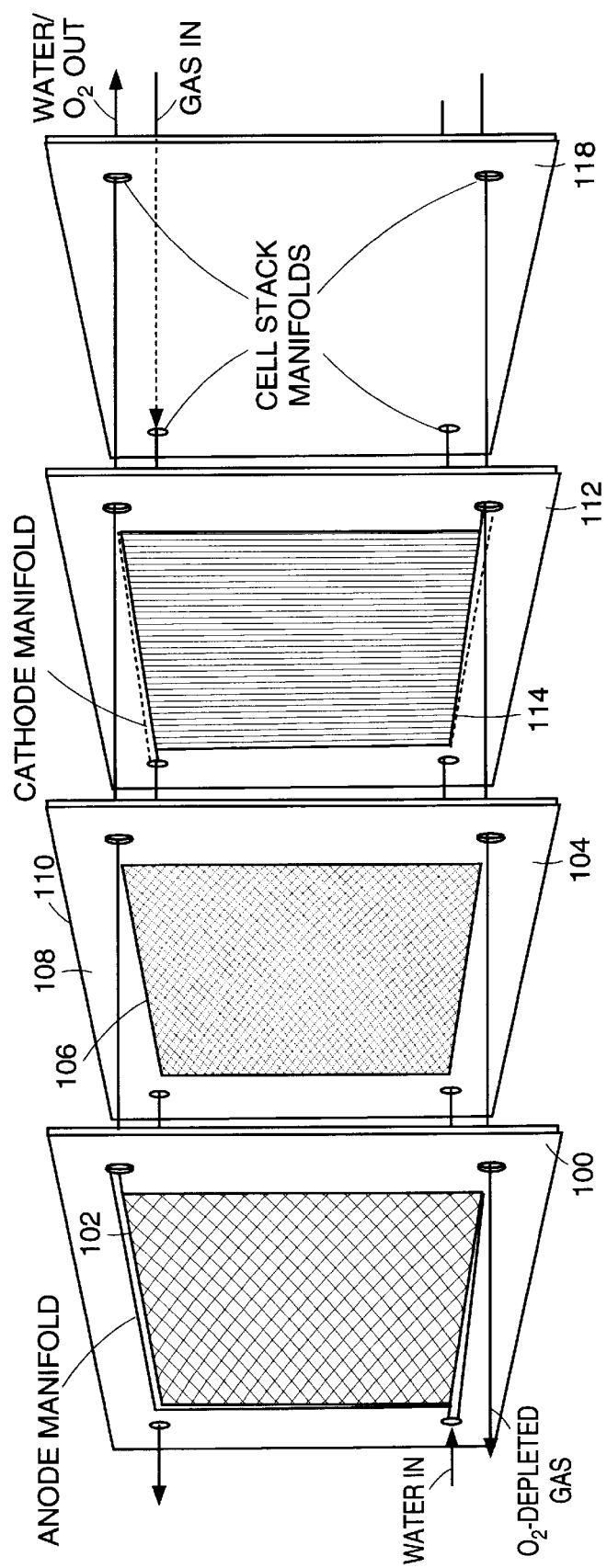
FIG. 4 is a perspective view of the cell components (repeating assembly) of the electrochemical oxygen control stack used in the system shown in FIG. 1.
Figure 5:
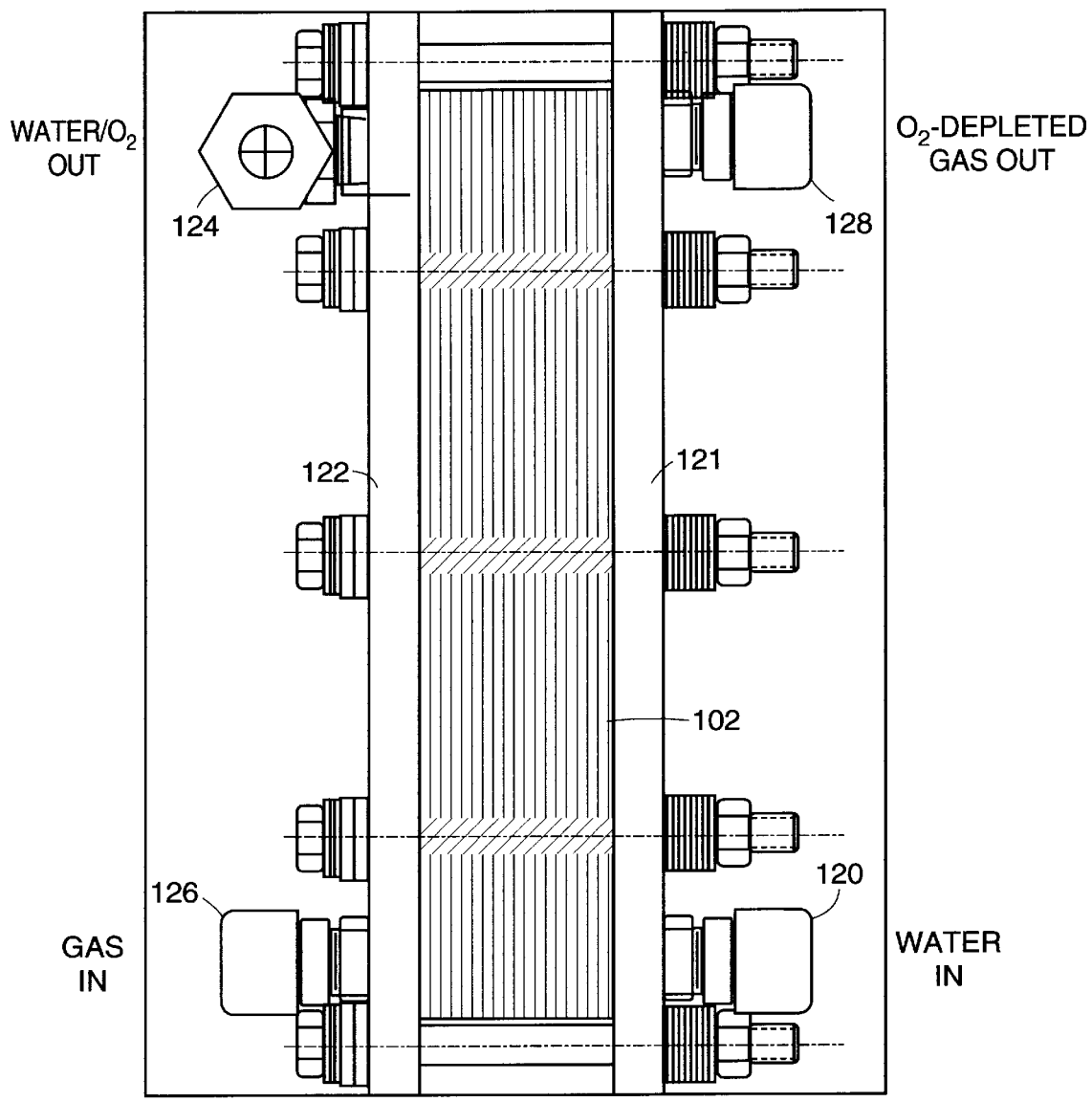
FIG. 5 is a top view of the electrochemical oxygen control cell stack used in the system shown in FIG. 1 showing reactant (in) and product (out) and repeating assemblies.

The EOC stack and reactant feed (in) and product (out) and repeating assemblies discussed above are shown in FIG. 5. The two reactant fluids are: 1) liquid water that is electrochemically oxidized to oxygen, protons and electrons at the anode catalyst and, 2) an oxygen-containing inert gas stream such as nitrogen whereby some of the oxygen is electrochemically reduced and depleted at the cathode catalyst 110 by the electrochemically transported protons and electrons to form water. Liquid water, that is preferably distilled or deionized, enters the EOC stack 50 through a fitting 120 attached to an EOC stack end plate 121. Referring also to FIG. 4, the water enters the repeating cell assembly through an opening in the anode water flow polysulfone frame 100 and flows along the lower groove and up the integral current collector and water distribution Pt plated Ti mesh 102. The water is uniformly distributed along the mesh and reacts with the bonded anode catalyst of the membrane and electrode assembly 104, which is in intimate contact with the Pt plated Ti mesh 102. The water is electrochemically oxidized to oxygen, protons and electrons. The protons are transported, along with some water, through the proton exchange membrane 108. The electrons are transported from the anode Ti mesh collector to an external circuit. The oxygen/water leaves the cell along the top groove and opening of the anode water flow frame 100. This process is repeated for the other electrically series (bipolar) and parallel flow connected cell assemblies. The $O_2$/water as it is formed in each of the cell assemblies leave the cell through the openings of the top manifold frames of the repeating assemblies. The liquid feed water is recirculated through the openings of the bottom manifolds of the repeating assemblies. The $O_2$/water exits the stack 50 through the stack end plate 122 and fitting 124.

The ambient $N_2$/$O_2$ reefer gas stream enters the EOC stack 50 through a fitting 126 attached to the end plate 122. It passes through the polysulfone cathode gas flow frame 112 opening to the integral current collector and gas distribution plate (grooved graphite paper) 114. The $N_2$/$O_2$ gas flow down the grooved graphite paper which is in intimate contact with bonded cathode catalyst 110 of the membrane and electrode assembly 104. The $O_2$ in the gas is distributed along the graphite paper grooves and is electrochemically reduced at the cathode catalyst 110 by the membrane transported protons and externally transported electrons to form water. The reefer gas containing $N_2$/depleted $O_2$ flow through the openings 128 in the lower manifolds. The $N_2/O_2$ is recirculated through the openings 126 in the upper manifolds. This process is repeated for the other repeating assemblies which are electrically series (bipolar) and parallel flow connected. The $N_2$/depleted $O_2$ exits the stack through the EOC stack end plate and fitting 128.

When the system described above is used as an electrochemical oxygen removal system, the oxygen-evolving anode structure that is typically used in an electrolyzer (as taught by U.S. Pat. Nos. 3,992,271; 4,039,409 and 4,311,569 the teachings of which are incorporated herein by reference) is combined with the oxygen-consuming cathode structure that is typically used in a fuel cell (as taught by U.S. Pat. No. 3,215,183 the teachings of which are incorporated herein by reference). The anode and cathode structures are bonded to opposite sides of a PEM such as Nafion 117 to form a MEA. This system then has the capability to generate a continuous stream of pure oxygen from a supply of air, or alternatively, to deplete the oxygen from an air stream or closed container using the same basic hardware and control systems. A fundamental feature of this system is the use of a PEM as an immobilized, rugged, solid form of the electrolyte. The electrode reactions are as follows:

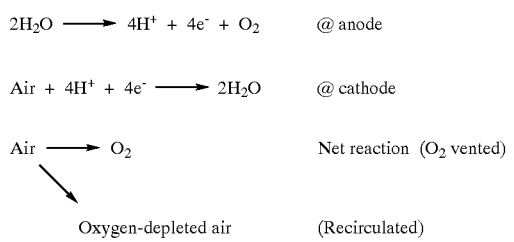

The oxygen-evolving anode reaction in a PEM cell containing combinations of Pt, Ir and Ru (as described in U.S. Pat. Nos. 3,992,271; 4,039,409 and 4,311,569 issued to LaConti et al.) as part of the anode structure can be driven at a very high rate. In electrolyzers manufactured for submarine oxygen generation, sustained operation at 2000 amps/square foot (ASF) has been demonstrated and 1000 ASF is the standard rate. Electrolyzers of this design have also been operated continuously for over 100,000 hours. The oxygen consuming cathode of a fuel cell can by operated at similar high rates (>2000 ASF) when provided with high performance electrodes containing Pt or Pt supported on carbon and supplied with pure oxygen and operated at elevated temperature (80–90° C.) and pressure (30–60 psig). When supplied with 20% $O_2$ (air) at lower pressure and temperature, the fuel cell cathode is considerably more limited (500–1000 ASF at 65° C., 30 psig), the lower boundary being the point at which the fuel cell voltage falls to zero. The cathode of the EOR cell, since it is driven by a DC power supply, can be pushed beyond this boundary into cogeneration of hydrogen concurrent with oxygen reduction if supplied with sufficient voltage. The desired boundary then for the hybrid cell is the point at which turnover to hydrogen evolution occurs, since this needs to be prevented in a practical EOR system. The hydrogen turnover point is controlled by the electrode voltage. The first voltage limit is set by the thermodynamics of the water electrolysis reaction to form hydrogen and oxygen; hydrogen evolution cannot commence until the cathode potential is pushed to 1.23 V below the theoretical oxygen electrode reaction. The boundary, in terms of total cell voltage, is further extended in practice, by the activation polarization of both electrodes, to about 1.35 V, a characteristic of the electrode catalysts used. The EOR system takes advantage of these characteristics to suppress hydrogen by holding the cell voltage below 1.35 V.

The system 10 used as an EOR system readily lends itself to oxygen concentration control and conversion to an EOC by way of adjusting the current supplied by the DC power supply; the removal rate is 3.75 cc $O_2$(STP)/min/amp/cell. This is a different mode of operation than currently used in an EOR product-preservation application in which the current always rises to the maximum supported by the oxygen level (within the preset cell voltage limits and current capability of the power supply 66) for maximum depletion of oxygen. For the EOC concentration control mode of operation, as opposed to the EOR depletion mode, control of the current in response to a feedback signal is essential. In this regard a linear DC power supply 66, in contrast to the simple voltage adjustable power supply used in the EOR system, offers remote programmable current control as well as automatic crossover from current control to voltage control at a programmable voltage limit. These features allow a current-adjustment response to the oxygen level detected in the reefer, using the process controller 70.

For control of the oxygen concentration at the variety of levels required, high-resolution measurement is necessary. The cell stack 50 itself has been used for this $O_2$ concentration measurement. To achieve this, the current limit at the power supply is set at the maximum to allow the cell current to rise to an oxygen concentration-controlled level. The interpretation of this current "signal" needs to be established by pre-calibration with analyzed gas mixes and programmed into the controller 70 as a slope-intercept algorithm (the "slope-intercept" part of the algorithm, Y=MX+B, is a standard mathematical description of a linear straight line relationship between two parameters; in this case, Y is the $O_2$ concentration and X is the cell current, M is the slope of the line or gain and B is the y-axis intercept or offset; when X is measured, Y can be calculated from the constants M and B established for the relationship; the logical part of the oxygen control algorithm is described below). At the control level, the DC current is reduced or set to zero for a timed interval, and then reset at maximum for a timed interval to again "sense" the oxygen concentration.

In one embodiment, the gas intake and returns were adapted with quick-disconnect ports and a connector was developed to access the reefer atmosphere through the rear floor drains. A pipe stub with a hose collar at the lower end was inserted into each floor drain and passed through the floor of the reefer to project through the base but below the main T-bar floor; this was done to prevent aspiration of water and floor debris into the EOC gas blower. The hose collars were then clamped around the external drain port stub to establish the desired seal. Two hoses with quick disconnects on both ends provided a flexible connection between the EOC system and the reefer. A differential pressure control interface was introduced by modifying one of the standard removable gas flushing port plugs. Three stainless steel tube stubs were brazed on to the face plate, one for nitrogen addition, one for air addition, and one to measure internal pressure versus external (atmospheric) pressure.

In one embodiment, the PEM cell stack 50 includes 12 cells which provides for an accelerated oxygen consumption rate over a stack with 10 cells. This is a practical limit to the number of cells because of field available AC power. A larger DC power supply amenable to direct current adjustment, to achieve finer control, is used instead of the smaller voltage-controlled power supply used in an EOR on-board system. The second solenoid valve 60 in the reefer differential pressure control system supplies air rather than nitrogen as the makeup gas to keep the oxygen level above the lower limit during the initial produce respiration stage, before dormancy, for product quality preservation.

Control software which runs on the process controller 70 causes the system to respond to the oxygen level in the reefer based on the EOC cell stack current. In measuring the oxygen level, the current is ramped up to the limiting current characteristic of "depletion" mode over a 55-second period, and the current is held at that level for a 5-second average. The measured value of current, X, is then used by the process controller 70 to calculate the oxygen concentration, Y, using the embedded slope/intercept constants, M and B, from the equation describing a linear relationship between "depletion" mode current and oxygen concentration, $Y=MX+B$ (as described above). The cell stack temperature measured by temperature sensor 87 can be used to compensate for changes in the concentration-controlled current with temperature changes. The oxygen concentration thus calculated is used by the process controller 70 to determine the control action for the next five minutes of operation as follows: 1) if the oxygen level is above the upper limit (e.g.1800 ppm), the stack current is set to "depletion" level ($I_{max}$ recorded during the measurement cycle); or 2) if the oxygen level is below the upper limit but above the control level (e.g.1600 ppm), the stack current is reduced fractionally (e.g. to 75% of $I_{max}$); or 3) if the oxygen level is below the control level (e.g.1600 ppm) but above the lower limit (e.g. 1400 ppm), the stack current is set to "idle" (e.g. 0.2 A or less); or 4) if the oxygen level is below the lower limit (e.g. 1400 ppm), the power supply is maintained at "idle" and in addition the differential pressure supply gas is switched from nitrogen to air. All 10 or 12 individual cell voltages are polled constantly with a cell voltage limit of 1.30 to 1.35 V, a stack voltage limit proportional to the number of cells (13.5 or 16.5 V), and a current limit (e.g. 45 A, dependent upon power supply capability and field available power) superseding all other stack control mode signals at all times.

The preferred embodiment of this invention is an EOC system with integral reactor feedback sensing that utilizes the EOC stack to electrochemically decrease ambient oxygen levels as well as monitor and control oxygen concentration. Alternative embodiments include use of the stack 50 to decrease ambient oxygen levels and a dedicated PEM electrochemical oxygen sensor for feedback sensing and control. The dedicated oxygen sensor can be located in the stack 50 or at the gas intake of the stack 50. Alternatively, commercial oxygen sensors such as those sold by Panametrics, Inc. of Waltham, Mass., could be used as the dedicated oxygen sensor.

The shipment of fresh meat and fish requires a very low oxygen level and must be maintained by active oxygen removal since these products do not respire. With the system described above using a differential pressure control system (to minimize differential pressure-amplified leakage) oxygen levels down to the range of 0.01 to 0.03% can been achieved. Since the lowest oxygen level achievable is desired when transporting fresh meat and fish, the system as an EOR system runs exhaustively without the requirement for sensor feedback or control of the depletion rate; in this mode the system is self adjusting in direct response to any changes in the oxygen level. For these applications it is also desirable to maintain a high humidity (e.g. >75% RH) to avoid drying of the product. The water-based PEM cell stack is capable of adding humidity to the recirculating gas stream since it runs at a higher temperature than the refrigerated container. The humidity can be regulated by adjusting the temperature of the return-gas heat exchanger 46. This can be implemented by the humidity sensor 45 which provides feedback control of splitter valve 47 which directs the flow of the cold intake reefer-gas over the heat exchanger 46. Addition of water vapor is less critical for most produce storage applications.

The following non-limiting examples will better describe the present invention:

EXAMPLE 1

For initial evaluation of the process controller and the hardware systems, the EOC system of the present invention was tested operating on ambient air. To establish a preliminary oxygen concentration-vs-current slope and intercept (M and B) and to test the feasibility of the oxygen control algorithm, the EOC system gas ports were attached to a 15 gallon container flushed with calibrated gas mixes at a high exchange rate. Only short runs were possible operating on gas cylinders at the high flow rates required to simulate the gas blower, limiting the run times to a few hours.

In testing, the EOC system was found to be capable of running on ambient air at near the 1 kVA limit of the DC power supply (60 A, 16 V) without reaching the individual cell limit of 1.30–1.35 V. However, because of the field requirement of operating on 120 VAC power from a 240 VAC 3 Ph transformer, it was necessary to set the current limit at 45 A. All of the hardware and control systems were found to operate within the design parameters. The oxygen control parameters based on stack current, established by operating briefly on calibrated gas mixes, proved to overestimate the oxygen concentration when the EOC system was attached to the reefer; this is attributed partly to improved stack performance as well as the higher cell stack temperatures achieved with extended operation.

Figure 6:
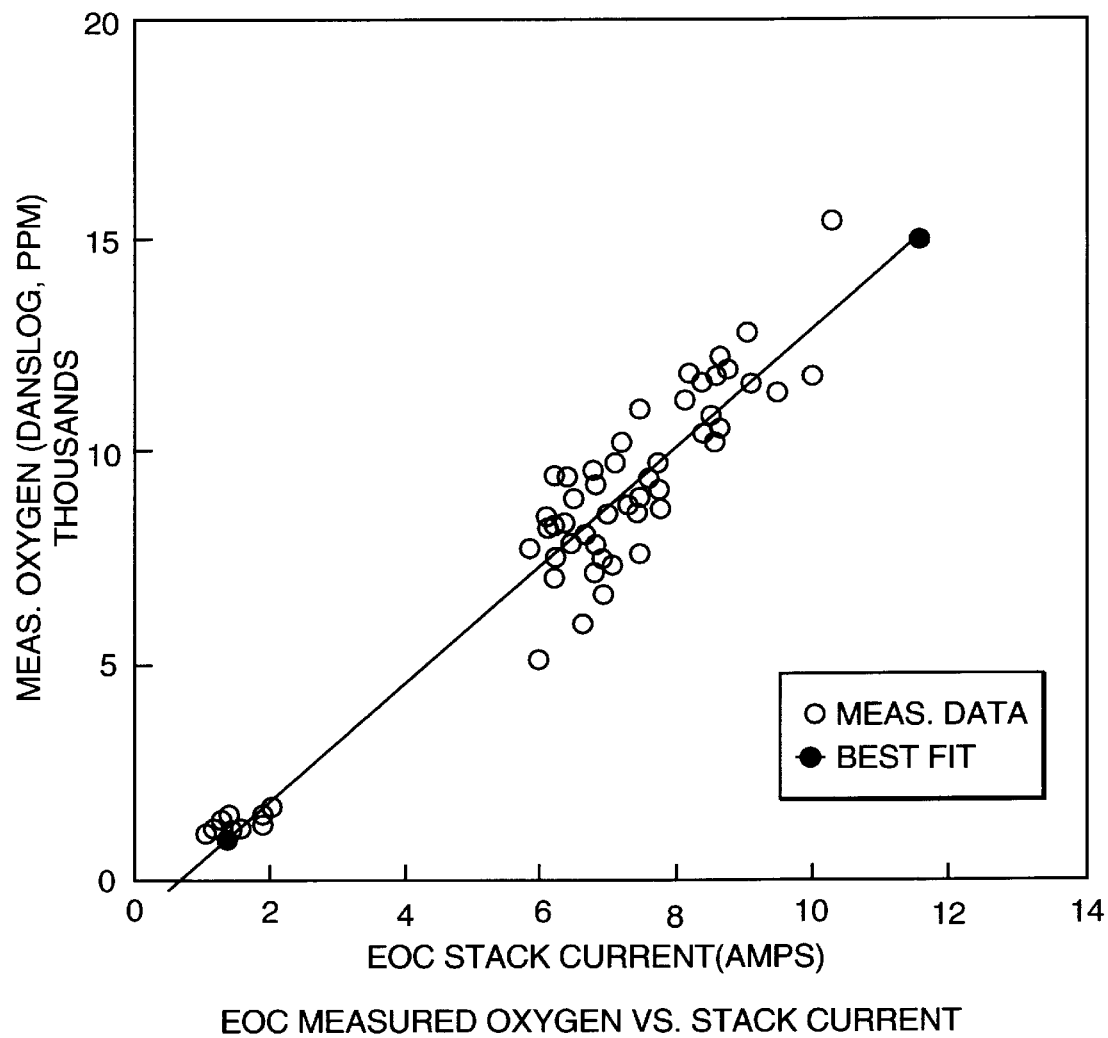
FIG. 6 is a graph of oxygen measured by the EOC feedback control system, illustrated in FIGS. 1 and 2, vs. stack current.

The EOC system of the present invention was also attached to a reefer filled with a dummy produce load (sealed aluminum boxes occupying about half of the van volume) and operated for several days to optimize the control algorithms. The relationship between oxygen concentration (ppm) and limiting current (A) for electrochemical reduction of $O_2$, when using the EOC stack as the reactor as well as the sensor is shown in FIG. 6. The slope is 1383 ppm $O_2$/Ampere. In the testing, using a dummy produce load in the reefer (active volume of about 1300 cf) and operating in "depletion" mode, the container oxygen level was reduced to 500 ppm. The evaporative water dispersion to the reefer was about 750 cc/hour. The differential pressure, controlled by the EOC system, was held at +0.02 to +0.04 inches of water column using compressed nitrogen or air. The adapters developed to interface with the reefer through the floor drains appeared to provide good access to the reefer atmosphere with no evidence of air leakage.

EXAMPLE 2

Disinfestation Trial.

A disinfestation trial was run with a small load of lettuce (400 lbs) of substandard quality with a dummy load of sealed aluminum boxes filling the balance of the reefer space. The 40 ft trailer volume is about 2340 cubic feet; the dummy load volume was estimated at about 1035 cf leaving an active volume of about 1305 cf. The effect of the small load of lettuce was to increase the oxygen removal demand on the EOC system since a full load of produce would normally consume oxygen through respiration over the first couple of days, until dormancy, assisting the EOC system. The insect count and the condition of the lettuce were evaluated and recorded before treatment using standard procedures used in the produce industry. The lettuce to be treated was loaded into the reefer, the reefer was sealed, flushed with nitrogen down to ~3500 ppm (with a full load of produce the van would normally be flushed down to about 10,000 ppm), and cooled down to 34° F. (1° C.). The EOC system was then started and operated continuously for 5 days. A control lot of lettuce was held at 34° F. in ambient air for the same period. The oxygen control process was adjusted slightly (revised slope and intercept values for the $O_2$ concentration vs. EOC system cell stack current used by the process controller). (Such revised values for the slope and intercept, M and B, are preferably manually inserted in the constants table used by the process control program) after about 2 days to more accurately reflect analyzed gas samples (measured by a PBI Dansensor Combi Check 9800-1). The treated lettuce and the control lot were then evaluated post-treatment to establish the relative insect mortality and lettuce condition in terms of freshness, appearance and evidence of low-oxygen damage. Both lots of lettuce were reevaluated after 5 days of additional storage at 45° F. (7° C.) in ambient air to assess post-treatment shelf life characteristics. The sampling of the ten 40-lb boxes of lettuce was as follows:

| Day 0: | Initial state: | Three boxes were sampled, 4 heads/box |
|---|---|---|
| Day 0 + 5: | Treated: | Five boxes were sampled, 3 heads/box |
|  | Control: | Three boxes were sampled, 4 heads/box |
| Day 5 + 5: | Treated: | Five boxes were sampled, 3 heads/box |
|  | Control: | Three boxes were sampled, 4 heads/box |

The oxygen concentration control range was set to 1600 ppm ±200 ppm. After flushing the reefer with nitrogen down to ~3500 ppm oxygen, the reefer ports were sealed and the EOC system was set to run in "control" mode, using the oxygen concentration-vs-current data (slope of 1290 ppm/ampere) determined in the preliminary test, which reduced the van atmosphere to about 1500 ppm in 12 hours. Because the cell stack performance had improved with time and temperature, this was an overestimate of the oxygen concentration and the oxygen level in the container was reduced to about 1000 ppm (measured by gas sampling with a PBI Dansensor) over the next 44 hours. Using the data collected in that period, the slope was reset to 1035 ppm/ampere. This had the effect of activating the EOC system's air-add valve (which would normally only operate during produce respiration with a full load) raising the oxygen level immediately to 1600 ppm. The oxygen level was then sustained in the control range for the balance of the test except near the end when the nitrogen supply for differential pressure control was inadvertently reduced; this resulted in an excursion above 2000 ppm because of air leakage during the negative pressure segment (−4"WC) of the reefer defrost cycle. The relative humidity was sustained at 93 to 98% for the duration of the test.

Prior to treatment the measured aphid mortality was 17%. After 5 days of low oxygen treatment at 34° F. the aphid mortality for the treated lot was 98% compared to 26% for the control lot. After an additional 5 days of storage in ambient air at 45° F. the aphid mortality for the treated lot was 81% compared to 18% for the control lot. This data is summarized in Table 1 below. The details of the insect counts are presented in Tables 2 to 4.

TABLE 1

Summary of Data on the Effect of Low-Oxygen on Lettuce Insect Mortality

| | CONTROLS | | | | LOW-OXYGEN TREATED | | | |
|---|---|---|---|---|---|---|---|---|
| Day | Live | Dead | Total | % Mort. | Live | Dead | Total | % Mort. |
| APHIDS | | | | | | | | |
| 0 | 159 | 32 | 191 | 17 | 0 | 0 | 0 | 0 |
| 0 + 5 | 69 | 24 | 93 | 26 | 5 | 212 | 217 | 98 |
| 5 + 5 | 195 | 43 | 238 | 18 | 40 | 174 | 214 | 81 |
| THRIPS | | | | | | | | |
| 0 | 3 | 0 | 3 | 0 | 0 | 0 | 0 | 0 |
| 0 + 5 | 0 | 0 | 0 | 0 | 0 | 1 | 1 | 100 |
| 5 + 5 | 0 | 0 | 0 | 0 | 0 | 0 | 0 | 0 |
| Others | | | | | | | | |
| 0 | 7 | 12 | 18 | 67 | 0 | 0 | 0 | 0 |
| 0 + 5 | | 11 | 18 | 61 | 0 | 29 | 29 | 100 |
| 5 + 5 | 8 | 22 | 30 | 73 | 1 | 48 | 49 | 98 |

TABLE 2

EOC Lettuce Disinfestation Test; Pre-Treatment Insect Counts (Day 0)

| Box # | Head # | # Live Aphids | # Dead Aphids | # Live Thrips | # Dead Thrips | # Live Other | # Dead Other |
|---|---|---|---|---|---|---|---|
| 1 | 1 | 8 | 2 | 0 | 0 | 0 | 0 |
|  | 2 | 30 | 5 | 1 | 0 | 0 | 0 |
|  | 3 | 3 | 0 | 0 | 0 | 0 | 1 |
|  | 4 | 2 | 2 | 0 | 0 | 0 | 1 |
| 2 | 1 | 1 | 2 | 0 | 0 | 1 | 3 |
|  | 2 | 94 | 17 | 0 | 0 | 2 | 3 |
|  | 3 | 7 | 1 | 0 | 0 | 2 | 1 |
| 3 | 1 | 3 | 0 | 2 | 0 | 0 | 1 |
|  | 2 | 4 | 1 | 0 | 0 | 0 | 1 |
|  | 3 | 7 | 2 | 0 | 0 | 1 | 1 |
| Totals | | 159 | 32 | 3 | 0 | 6 | 12 |

TABLE 3

EOC Lettuce Disinfestation Test; Post-Treatment Insect Counts (34° F.; Day 5)

| Box # | Head # | # Live Aphids | # Dead Aphids | # Live Thrips | # Dead Thrips | # Live Other | # Dead Other |
|---|---|---|---|---|---|---|---|
| TREATED LOT | | | | | | | |
| 1 | 1 | 0 | 7 | 0 | 0 | 0 | 0 |
|  | 2 | 0 | 8 | 0 | 1 | 0 | 1 |
|  | 3 | 0 | 5 | 0 | 0 | 0 | 3 |
| 2 | 1 | 0 | 3 | 0 | 0 | 0 | 1 |
|  | 2 | 2 | 8 | 0 | 0 | 0 | 3 |
|  | 3 | 0 | 9 | 0 | 0 | 0 | 0 |
| 3 | 1 | 0 | 2 | 0 | 0 | 0 | 2 |
|  | 2 | 1 | 2 | 0 | 0 | 0 | 3 |
|  | 3 | 2 | 151 | 0 | 0 | 0 | 2 |
| 4 | 1 | 0 | 2 | 0 | 0 | 0 | 2 |
|  | 2 | 0 | 3 | 0 | 0 | 0 | 2 |
|  | 3 | 0 | 1 | 0 | 0 | 0 | 1 |

TABLE 3-continued

EOC Lettuce Disinfestation Test; Post-Treatment Insect Counts (34° F.; Day 5)

| Box # | Head # | # Live Aphids | # Dead Aphids | # Live Thrips | # Dead Thrips | # Live Other | # Dead Other |
|---|---|---|---|---|---|---|---|
| 5 | 1 | 0 | 5 | 0 | 0 | 0 | 1 |
|   | 2 | 0 | 4 | 0 | 0 | 0 | 4 |
|   | 3 | 0 | 2 | 0 | 0 | 0 | 4 |
| Totals |  | 5 | 212 | 0 | 1 | 0 | 29 |
| CONTROL LOT | | | | | | | |
| 1 | 1 | 1 | 6 | 0 | 0 | 1 | 2 |
|   | 2 | 6 | 1 | 0 | 0 | 0 | 0 |
|   | 3 | 3 | 1 | 0 | 0 | 1 | 2 |
| 2 | 1 | 11 | 2 | 0 | 0 | 1 | 1 |
|   | 2 | 11 | 2 | 0 | 0 | 1 | 1 |
|   | 3 | 25 | 7 | 0 | 0 | 0 | 3 |
| 3 | 1 | 2 | 1 | 0 | 0 | 1 | 0 |
|   | 2 | 3 | 2 | 0 | 0 | 1 | 2 |
|   | 3 | 7 | 2 | 0 | 0 | 1 | 0 |
| Totals |  | 69 | 24 | 0 | 0 | 7 | 11 |

TABLE 4

EOC Lettuce Disinfestation Test; Shelf-Life Insect Counts (45° F.; Day 10)

| Box # | Head # | # Live Aphids | # Dead Aphids | # Live Thrips | # Dead Thrips | # Live Other | # Dead Other |
|---|---|---|---|---|---|---|---|
| TREATED LOT | | | | | | | |
| 1 | 1 | 2 | 2 | 0 | 0 | 0 | 2 |
|   | 2 | 3 | 21 | 0 | 0 | 0 | 1 |
|   | 3 | 0 | 3 | 0 | 0 | 0 | 3 |
| 2 | 1 | 2 | 33 | 0 | 0 | 1 | 3 |
|   | 2 | 11 | 8 | 0 | 0 | 0 | 2 |
|   | 3 | 8 | 11 | 0 | 0 | 0 | 2 |
| 3 | 1 | 4 | 22 | 0 | 0 | 0 | 5 |
|   | 2 | 1 | 4 | 0 | 0 | 0 | 4 |
|   | 3 | 0 | 1 | 0 | 0 | 0 | 4 |
| 4 | 1 | 0 | 2 | 0 | 0 | 0 | 6 |
|   | 2 | 0 | 1 | 0 | 0 | 0 | 1 |
|   | 3 | 0 | 2 | 0 | 0 | 0 | 2 |
| 5 | 1 | 4 | 46 | 0 | 0 | 0 | 7 |
|   | 2 | 0 | 13 | 0 | 0 | 0 | 4 |
|   | 3 | 0 | 5 | 0 | 0 | 0 | 3 |
| Totals |  | 35 | 174 | 0 | 0 | 1 | 49 |
| CONTROL LOT | | | | | | | |
| 1 | 1 | 8 | 2 | 0 | 0 | 0 | 3 |
|   | 2 | 35 | 12 | 0 | 0 | 0 | 1 |
|   | 3 | 86 | 22 | 0 | 0 | 0 | 5 |
| 2 | 1 | 11 | 1 | 0 | 0 | 3 | 2 |
|   | 2 | 3 | 1 | 0 | 0 | 0 | 2 |
|   | 3 | 39 | 4 | 0 | 0 | 3 | 2 |
| 3 | 1 | 1 | 0 | 0 | 0 | 2 | 3 |
|   | 2 | 2 | 0 | 0 | 0 | 0 | 2 |
|   | 3 | 10 | 1 | 0 | 0 | 0 | 2 |
| Totals |  | 195 | 43 | 0 | 0 | 8 | 22 |

The end-of-season lettuce available for this test Jupiter/Orion variety) was substandard and expected to be fragile. In the as-received state pre-test, the lettuce was rated "strong" (4 to 4.5 on a 0–5 intensity scale) in subjective appearance with a trace of butt discoloration at the cut and showed a range of maturities (24 to 37 leaves/head); more dense heads are more prone to internal low-oxygen damage. At the end of the 5-day low-oxygen treatment the lettuce was degraded to "moderate" (3 on the intensity scale) in subjective appearance but was rated essentially the same as the control lot and showed no evidence of low-oxygen damage. At the end of the post-treatment 5-day "shelf life" test at 45° F. most of the treated lettuce showed some internal low-oxygen damage rated at none to "slight" (0 to 2 on the intensity scale); the subjective appearance was not significantly changed, and there was more butt discoloration but less russet spotting than in the control lot. The internal low-oxygen damage may be attributed in part to the fragile quality of the lettuce and in part to the excursion below the lower oxygen limit midway in the treatment before the control parameters were reset.

While the foregoing invention has been described with reference to its preferred embodiments, various alterations and modifications will occur to those skilled in the art. All such alterations and modifications are intended to fall within the scope of the appended claims.

What is claimed is:

1. A proton-exchange membrane (PEM) based electro-chemical oxygen control (EOC) system for depleting, monitoring and controlling oxygen in a closed container, said system comprising:

a stack of a plurality of series-connected electrochemical oxygen transfer cells, each of said cells having a cathode and an anode, said anode and said cathode in each cell being in intimate contact with and separated by a proton-exchange membrane;

a power supply for imposing a controlled voltage and current on said electrochemical transfer cells to cause said anode to evolve oxygen from a supply of water and said cathode to consume oxygen from the recirculating gas in the closed container;

a process controller for providing an integral reactor feedback electrical signal in response to an oxygen level in the closed container, to deplete, monitor and control the oxygen concentration in said recirculating gas in the dosed container to levels satisfactory for disinfestation and/or retention of the freshness, appearance and taste of the contents of the dosed container.

2. The EOC system of claim 1 wherein said process controller is programmed to periodically allow current in said cells to rise to an oxygen concentration-controlled level as a measurement of oxygen in the closed container.

3. The EOC system of claim 1 further comprising an inert gas supply from which said inert gas is introduced into the closed container upon receipt of a signal from said process controller in order to avoid creating a negative pressure in said closed container.

4. The EOC system of claim 1 further comprising an oxygen supply from which oxygen is released into said closed container upon receipt of a signal from said processor in order to simultaneously avoid creating a negative pressure in said closed container and keep the oxygen level above a lower limit.

5. A process for depleting, monitoring, and controlling the level of oxygen in a dosed container, said process comprising the steps of:

applying a predetermined voltage to a stack of a plurality of series-connected electrochemical oxygen transfer cells, each of such cells having a cathode and an anode, said anode and said cathode in each cell being in intimate contact with and separated by a proton-exchange membrane;

measuring the cell stack current and converting said current to a numerical value representing an oxygen level;

controlling the stack current based on said determined oxygen level, said control of said stack current resulting in the control of the rate of oxygen depletion in the closed container.

6. The process for depleting, monitoring, and controlling the level of oxygen in a closed container of claim 5 further comprising the steps of:

periodically allowing said generated current to rise to a concentration-controlled limit in a measurement mode;

resetting said current based on a desired oxygen level in a control mode.

7. The process for depleting, monitoring, and controlling the level of oxygen in a dosed container of claim 6 further comprising the step of maintaining said desired oxygen level by periodically remeasuring oxygen concentration and then, depending on the desired oxygen level, continuing electrochemical oxygen removal or introducing oxygen into said closed container.

8. The process for depleting, monitoring, and controlling the level of oxygen in a closed container of claim 5 further comprising the steps of:

constantly measuring the cell voltage in each of said cells to ensure that said cell voltage remains below a preselected cell voltage limit;

adjusting current applied to said stack of cells as necessary to avoid exceeding said cell voltage limit.

9. The process for depleting, monitoring, and controlling the level of oxygen in a closed container of claim 5 further comprising the steps of:

constantly measuring the cell voltage in each of said cells to ensure that said cell voltage remains below a preselected cell voltage limit;

adjusting total voltage applied to said stack of cells as necessary to avoid exceeding said cell voltage limit.

10. The process for depleting, monitoring, and controlling the level of oxygen in a closed container of claim 5 further comprising the steps of:

producing oxygen, protons and electrons at each anode;

transporting protons from each said anode to a corresponding cathode in the same cell across a proton exchange membrane while concurrently transferring electrons through an external circuit from said anode to said cathode;

reducing oxygen at said cathode from an ambient level in the recirculating gas to a predetermined level in the closed container.

* * * * *

UNITED STATES PATENT AND TRADEMARK OFFICE
CERTIFICATE OF CORRECTION

PATENT NO : 6,179,986
DATED : January 30, 2001
INVENTOR(S): Larry L. Swette, Anthony B. LaConti It is certified that error appears in the above-identified patent and that said Letters Patent is hereby corrected as shown below:

In claim 1, line 38, after "recirculating gas in the", "dosed" should be changed to --closed--;

In claim 1, line 40, after "contents of the", "dosed" should be changed to --closed--;

In claim 5, line 56 after "oxygen in a", "dosed" should be changed to --closed--;

In claim 7, line 13 after "level of oxygen in a", "dosed" should be changed to --closed--.

Signed and Sealed this

Twenty-ninth Day of May, 2001

NICHOLAS P. GODICI

Attest:

Attesting Officer

Acting Director of the United States Patent and Trademark Office